United States Patent
Tanaka et al.

(10) Patent No.: US 10,065,149 B2
(45) Date of Patent: Sep. 4, 2018

(54) GAS-LIQUID CONTACTOR AND $CO_2$-RECOVERING APPARATUS PROVIDED THEREWITH

(71) Applicant: MITSUBISHI HEAVY INDUSTRIES, LTD., Tokyo (JP)

(72) Inventors: Hiroshi Tanaka, Tokyo (JP); Hiromitsu Nagayasu, Tokyo (JP); Takuya Hirata, Tokyo (JP); Atsuhiro Yukumoto, Tokyo (JP); Tsuyoshi Oishi, Tokyo (JP); Takahiko Endo, Tokyo (JP); Shimpei Kawasaki, Tokyo (JP)

(73) Assignee: MITSUBISHI HEAVY INDUSTRIES ENGINEERING LTD., Yokohama-shi (JP)

( * ) Notice: Subject to any disclaimer, the term of this patent is extended or adjusted under 35 U.S.C. 154(b) by 269 days.

(21) Appl. No.: 14/889,975

(22) PCT Filed: Jan. 21, 2015

(86) PCT No.: PCT/JP2015/051578
§ 371 (c)(1),
(2) Date: Nov. 9, 2015

(87) PCT Pub. No.: WO2015/115276
PCT Pub. Date: Aug. 6, 2015

(65) Prior Publication Data
US 2016/0199777 A1    Jul. 14, 2016

(30) Foreign Application Priority Data
Jan. 31, 2014 (JP) .................................. 2014-017838

(51) Int. Cl.
*B01D 53/14* (2006.01)
*B01D 53/18* (2006.01)

(52) U.S. Cl.
CPC ....... *B01D 53/185* (2013.01); *B01D 53/1406* (2013.01); *B01D 53/1425* (2013.01);
(Continued)

(58) Field of Classification Search
CPC ...... B01D 2252/204; B01D 2258/0283; B01D 53/1406; B01D 53/1425; B01D 53/1475; B01D 53/185; Y02C 10/06
See application file for complete search history.

(56) References Cited

U.S. PATENT DOCUMENTS 4,250,152 A * 2/1981 Biedell ................ B01D 53/501
423/166
6,138,378 A    10/2000 Takashina et al.
(Continued)

FOREIGN PATENT DOCUMENTS

JP      8-80421 A      3/1996
JP   2001-505824 A    5/2001
(Continued)

OTHER PUBLICATIONS

International Search Report dated Apr. 7, 2015. issued in counterpart application No. PCT/JP2015/051578 (1 page).
(Continued)

*Primary Examiner* — Cabrena Holecek
(74) *Attorney, Agent, or Firm* — Westerman, Hattori, Daniels & Adrian, LLP

(57) ABSTRACT

A gas-liquid contactor is obtained by including a header pipe for supplying washing water, in a direction perpendicular to a vertical axis direction, the header pipe being disposed above a packed bed contacting section through which exhaust gas moves upward and passes; and spray nozzles for discharging spray water, the nozzles being disposed, in an upward orientation, with predetermined intervals on the header pipe. The spray water that has been discharged from
(Continued)

the spray nozzles is supplied at a low liquid flow rate. The discharged spray water becomes a liquid film and falls downward along the surface of the header pipe, and then falls and spreads in the packed bed contacting section, so that the washing water is made to contact the exhaust gas moving upward through the packed bed contacting section. Accordingly, the washing water is used to clear and remove water-soluble substances contained in the exhaust gas.

7 Claims, 10 Drawing Sheets

(52) U.S. Cl.
CPC .... *B01D 53/1475* (2013.01); *B01D 2252/204* (2013.01); *B01D 2258/0283* (2013.01); *Y02C 10/06* (2013.01)

(56) References Cited

U.S. PATENT DOCUMENTS

| | | | |
|---|---|---|---|
| 2003/0045756 A1 | 3/2003 | Mimura et al. | |
| 2005/0046052 A1 | 3/2005 | Okada et al. | |
| 2007/0113737 A1* | 5/2007 | Hagg | B01D 53/18 95/199 |
| 2013/0319237 A1* | 12/2013 | Zaman | B01D 53/18 95/210 |

FOREIGN PATENT DOCUMENTS

| | | |
|---|---|---|
| JP | 2002-126439 A | 5/2002 |
| JP | 2005-28284 A | 2/2005 |
| JP | 2005-46830 A | 2/2005 |
| WO | 2005/079955 A1 | 9/2005 |
| WO | 2009/060642 A1 | 5/2009 |

OTHER PUBLICATIONS

Written Opinion dated Apr. 7, 2015. issued in counterpart application No. PCT/JP2015/051578 (3 pages).
Extended (Supplementary) European Search Report dated May 10, 2016, issued in counterpart European Patent Application No. 15 742 890.5. (7 pages).

* cited by examiner

GAS-LIQUID CONTACTOR AND $CO_2$-RECOVERING APPARATUS PROVIDED THEREWITH

TECHNICAL FIELD

The present invention relates to a gas-liquid contactor and a $CO_2$-recovering apparatus provided therewith.

BACKGROUND ART

As one of the causes of the global warming phenomenon, the greenhouse effect caused by $CO_2$ is pointed out, and countermeasures thereagainst have also been a pressing need internationally in order to protect the environment of earth. As generation sources of $CO_2$, in the fields of activity of all human beings which combust fossil fuels, the need for suppression of emission of $CO_2$ tends to become stronger. Along with this, methods of bringing combustion gas of boilers into contact with amine-based absorption liquids, such as aqueous amine solutions and removing and recovering $CO_2$ in the exhaust gas have been energetically studied for, for example, power generation facilities, such as thermoelectric power plants which use a large quantity of fossil fuels.

When $CO_2$ is removed from exhaust gas using such absorption liquids, amine compounds are entrained in $CO_2$-removed exhaust gas from which $CO_2$ has been recovered. Also, in order to prevent a situation in which air pollution caused by the amine compounds occurs, it is necessary to reduce the emission amount of the amine compounds emitted together with the $CO_2$-removed exhaust gas.

In the related art, PTL 1 discloses providing a plurality of washing sections which bring washing water into gas-liquid contact with $CO_2$-removed exhaust gas from which $CO_2$ has been absorbed and removed by gas-liquid contact with an absorption liquid, thereby recovering amine compounds entrained in the $CO_2$-removed exhaust gas, and sequentially performing recovery processing of amines entrained in the $CO_2$-removed exhaust gas in the plurality of main washing sections. As the washing water of this PTL 1, condensed water separated by condensing moisture included in $CO_2$ in the processing of removing $CO_2$ from the amine-based absorption liquid which has absorbed $CO_2$, and regenerating the amine-based absorption liquid is used.

Additionally, in the related art, PTL 2 discloses providing a cooling section which cools $CO_2$-removed exhaust gas from which $CO_2$ has been absorbed and removed by the gas-liquid contact with an absorption liquid, and a contacting section which brings condensed water condensed in the cooling section into countercurrent contact with the $CO_2$-removed exhaust gas. Moreover, PTL 2 discloses providing a washing section which brings washing water into gas-liquid contact with the $CO_2$-removed exhaust gas from which $CO_2$ has been absorbed and removed by gas-liquid contact with the absorption liquid, thereby recovering amine compounds entrained in the $CO_2$-removed exhaust gas, and condensed water which has been condensed in a cooling tower which cools the exhaust gas before $CO_2$ is recovered and is used as washing water.

CITATION LIST

Patent Literature

[PTL 1]: Japanese Unexamined Patent Application Publication No. 2002-126439
[PTL 2]: Japanese Unexamined Patent Application Publication No. 8-80421

SUMMARY OF INVENTION

Technical Problem

However, in recent years, it has been desired to further reduce the concentration of an absorption liquid component emitted while remaining in the $CO_2$-removed exhaust gas from a viewpoint of environmental preservation. Particularly, when a $CO_2$-recovering apparatus is installed with respect to exhaust gas from thermoelectric power plants or the like with a high processing gas flow rate expected in the future, since the emission amount of the exhaust gas is large, the emission amount of the absorption liquid component emitted while remaining in the $CO_2$-removed exhaust gas tends to increase, and it is required to further reduce the concentration of basic amine compounds (absorption liquid component) to be emitted.

Particularly, when preliminary washing or deep washing is performed before and after a main washing section which performs circulation scrubbing using the washing water, and when the flow rate of the washing water is a very low flow rate (for example, equal to or lower than 3 $m^3/m^2 \cdot h$), there is a problem in that the washing water is dispersed or entrained by gas.

For this reason, in the case of a spray method, in specifications with the reference of droplet diameter which is the same as a normal flow rate condition (for example, equal to or higher than 10 $m^3/m^2 \cdot h$) in order to prevent entrainment caused by refinement of droplets, there is a problem in that the spread of sprayed droplets becomes small, and liquid dispersion becomes poor.

Additionally, in the case of a normal trough method, liquid flow-down points cannot be secured, and a liquid is made to flow downward from a small number of points. As a result, there is a problem in that liquid dispersion becomes poorer.

Hence, in the gas-liquid contactor which brings the exhaust gas into contact with the washing water to clear the exhaust gas, the appearance of a gas-liquid contactor in which the uniform dispersibility of the washing water on a low liquid flow rate (for example, equal to or lower than 3 $m^3/m^2 \cdot h$) condition can be secured, and entrainment can be suppressed is desired.

The invention has been made in order to solve the above-described problems, and an object thereof is to provide a gas-liquid contactor in which the uniform dispersibility of washing water on a low liquid flow rate condition can be secured and entrainment can be suppressed, and a $CO_2$-recovering apparatus provided therewith.

Solution to Problem

A first invention of the invention for solving the above-described problems is a gas-liquid contactor including a header pipe for supplying a liquid in a direction perpendicular to a vertical axis direction, the header pipe being installed above a packed bed contacting section through which an exhaust gas moves upward and passes; and spray nozzles for discharging spray water, the nozzles being installed, in an upward orientation, at predetermined intervals on the header pipe. The spray water is supplied at a low liquid flow rate, the discharged spray water becomes a liquid film and falls downward along the surface of the header pipe, and then falls and spreads in the packed bed contacting section, so that the liquid is made to contact the gas moving upward through the packed bed contacting section and is used to clear and remove water-soluble substances contained in the gas.

A second invention based on the first invention is the gas-liquid contactor in which a dispersion plate is integrally provided along an axial direction of a bottom part of the header pipe.

A third invention based on the second invention is the gas-liquid contactor in which a lower end of the dispersion plate comes into contact with an upper surface of the packed bed contacting section.

A fourth invention based on any one invention of the first to third inventions is the gas-liquid contactor in which partitions which partition the spray nozzles provided on the header pipe are provided in the shape of a double cross.

A fifth invention based on the fourth invention is the gas-liquid contactor in which the packed bed contacting section is provided with partitions for packed bed contacting corresponding to the partitions.

A sixth invention is a $CO_2$-recovering apparatus including an absorption tower which brings an exhaust gas containing $CO_2$ into contact with a $CO_2$ absorption liquid to remove $CO_2$; an absorption liquid regeneration tower which regenerates a rich solution, which has absorbed $CO_2$, through heat exchange; a rich solution supply line through which the rich solution is extracted from the absorption tower and is introduced into the absorption liquid regeneration tower side; and a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower. The absorption tower includes a $CO_2$ absorption section which brings the exhaust gas containing $CO_2$ into contact with the $CO_2$ absorption liquid and absorbs the $CO_2$ in the exhaust gas; a main washing section which is disposed on an upper stage side of the $CO_2$ absorption section, cools a $CO_2$-removed exhaust gas from which $CO_2$ has been removed, and recovers entrained $CO_2$ absorption liquid using washing water; a condensed water receiving section which is disposed on a lower side of the main washing section, and recovers the condensed water within the main washing section; and the gas-liquid contactor according to any one invention of the first to fifth inventions which is provided on a lower stage side of the condensed water receiving section, and performs preliminary washing of the $CO_2$-removed exhaust gas.

A seventh invention is a $CO_2$-recovering apparatus including an absorption tower which brings an exhaust gas containing $CO_2$ into contact with a $CO_2$ absorption liquid to remove $CO_2$; an absorption liquid regeneration tower which regenerates a rich solution, which has absorbed $CO_2$, through heat exchange; a rich solution supply line through which the rich solution is extracted from the absorption tower and is introduced into the absorption liquid regeneration tower side; and a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower. The absorption tower includes a $CO_2$ absorption section which brings the exhaust gas containing $CO_2$ into contact with the $CO_2$ absorption liquid and absorbs the $CO_2$ in the exhaust gas; a main washing section which is disposed on an upper stage side of the $CO_2$ absorption section, cools a $CO_2$-removed exhaust gas from which $CO_2$ has been removed, and recovers entrained $CO_2$ absorption liquid using washing water; a condensed water receiving section which is disposed on a lower side of the main washing section, and recovers the condensed water within the main washing section; and the gas-liquid contactor according to any one invention of the first to fifth inventions which is provided on an upper stage side of the main washing section, and performs deep washing of the $CO_2$-removed exhaust gas after passage through the main washing section.

An eighth invention is a $CO_2$-recovering apparatus including an absorption tower which brings an exhaust gas containing $CO_2$ into contact with a $CO_2$ absorption liquid to remove $CO_2$; an absorption liquid regeneration tower which regenerates a rich solution, which has absorbed $CO_2$, through heat exchange; a rich solution supply line through which the rich solution is extracted from the absorption tower and is introduced into the absorption liquid regeneration tower side; and a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower. The absorption tower includes a $CO_2$ absorption section which brings the exhaust gas containing $CO_2$ into contact with the $CO_2$ absorption liquid and absorbs the $CO_2$ in the exhaust gas; a main washing section which is disposed on an upper stage side of the $CO_2$ absorption section, cools a $CO_2$-removed exhaust gas from which $CO_2$ has been removed, and recovers entrained $CO_2$ absorption liquid using washing water; a condensed water receiving section which is disposed on a lower side of the main washing section, and recovers the condensed water within the main washing section; the gas-liquid contactor according to any one invention of the first to fifth inventions which is provided on a lower stage side of the condensed water receiving section, and performs preliminary washing of the $CO_2$-removed exhaust gas; and the gas-liquid contactor according to any one invention of the first to fifth inventions which is provided on an upper stage side of the main washing section, and performs deep washing of the $CO_2$-removed exhaust gas after passage through the main washing section.

Advantageous Effects of Invention

According to the invention, the spray water which has flowed out upward flows downward while spreading on the surface of the header pipe in a wet wall state. Therefore, since the liquid film is formed, and the liquid film falls gradually on the upper surface of the packed bed contacting section, the excellent dispersibility of the liquid to the packed bed contacting section can be secured even with a low liquid flow rate condition.

DESCRIPTION OF EMBODIMENTS

Preferred embodiments of the invention will be described below in detail with reference to the accompanying drawings. In addition, the invention is not limited by the embodiments and includes those configured by combining respective embodiments when there are a plurality of embodiments.

Embodiment 1

Figure 1:
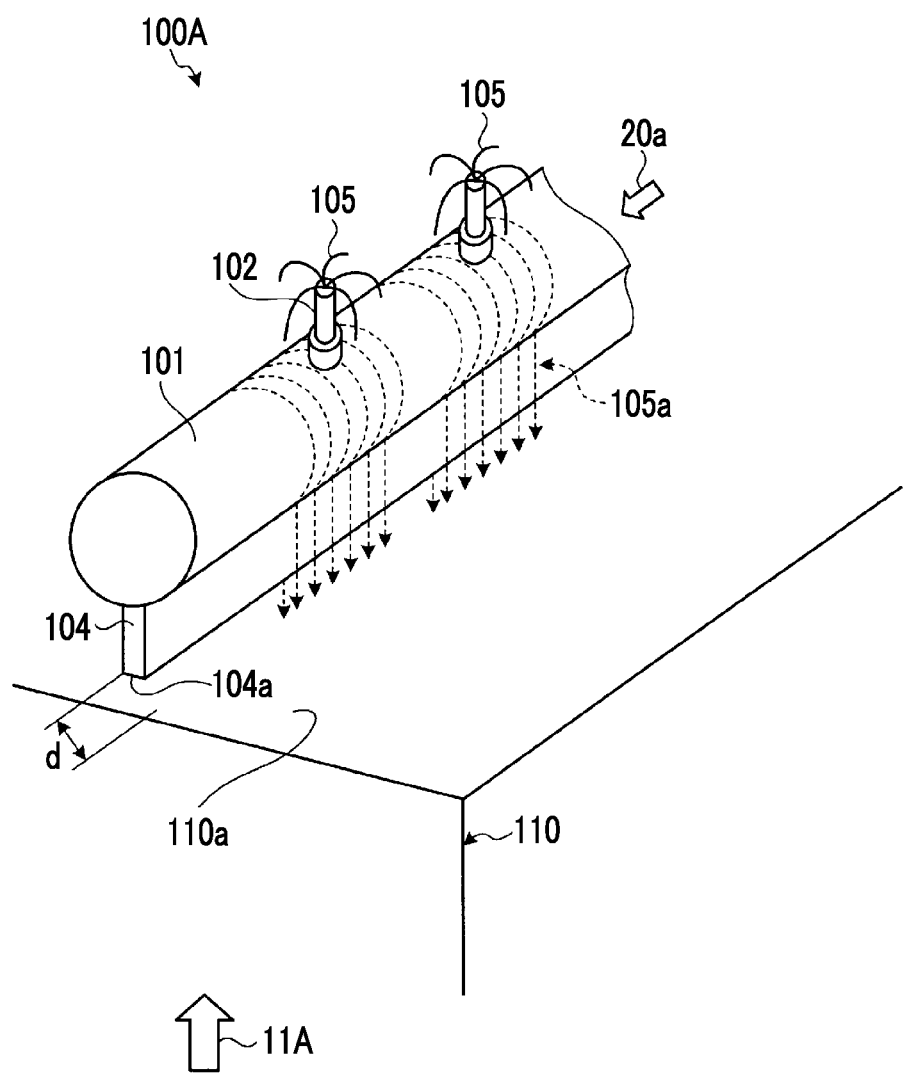
FIG. 1 is a perspective view of a gas-liquid contactor related to Embodiment 1.
Figure 2:
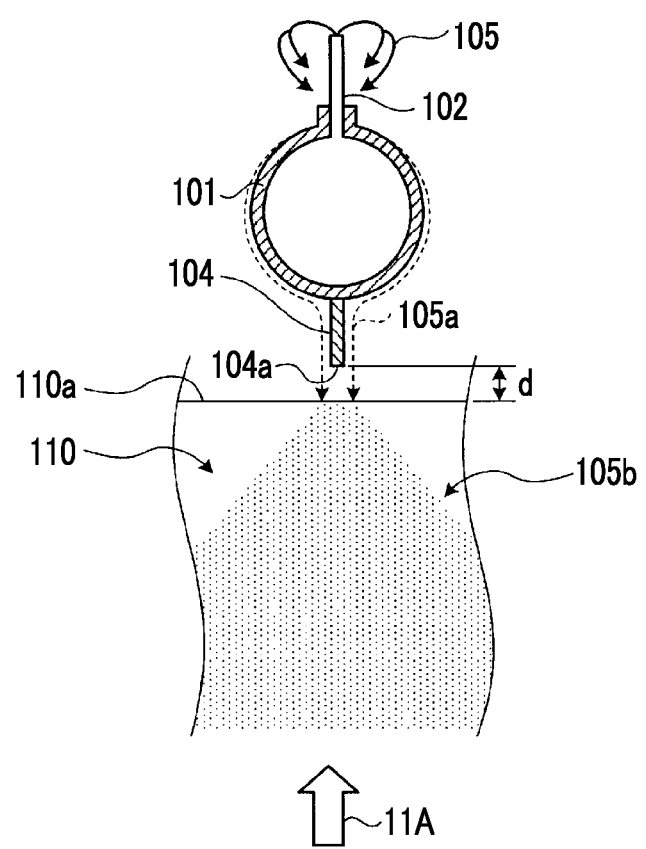
FIG. 2 is a sectional view of the gas-liquid contactor related to Embodiment 1.
Figure 3:
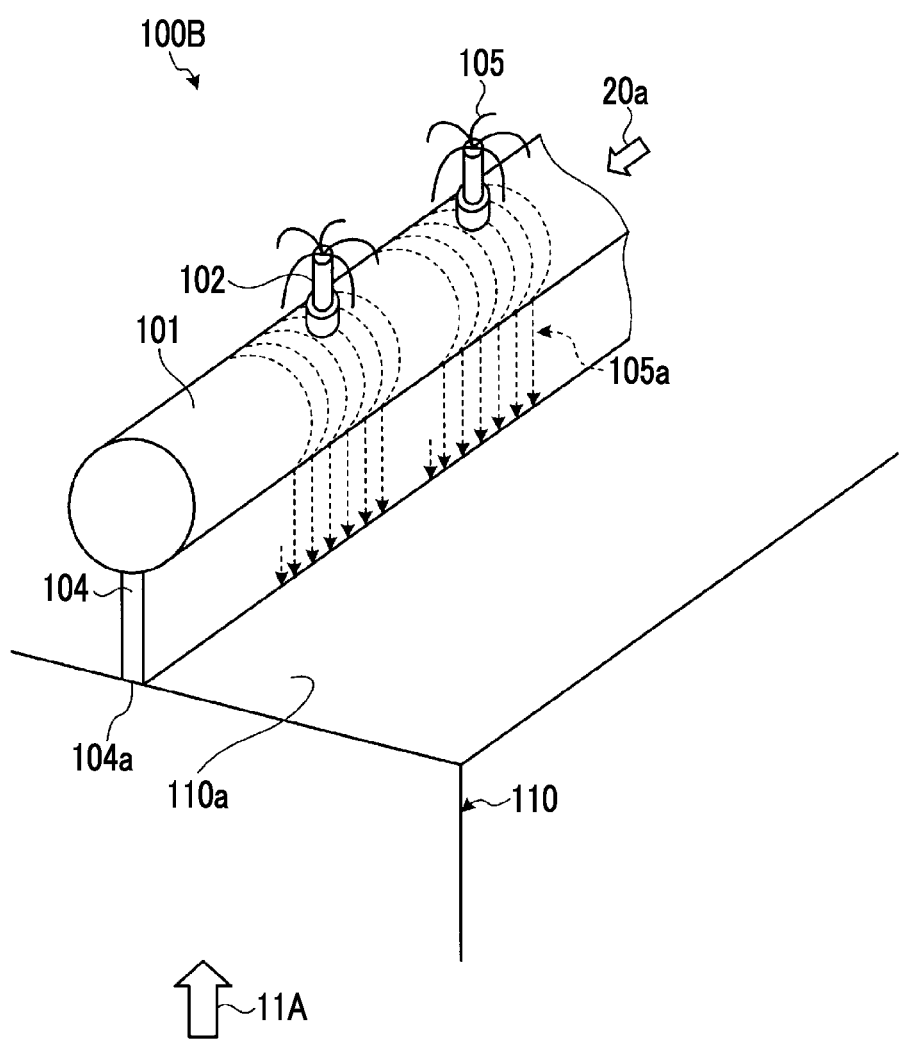
FIG. 3 is a perspective view of another gas-liquid contactor related to Embodiment 1.
Figure 4:
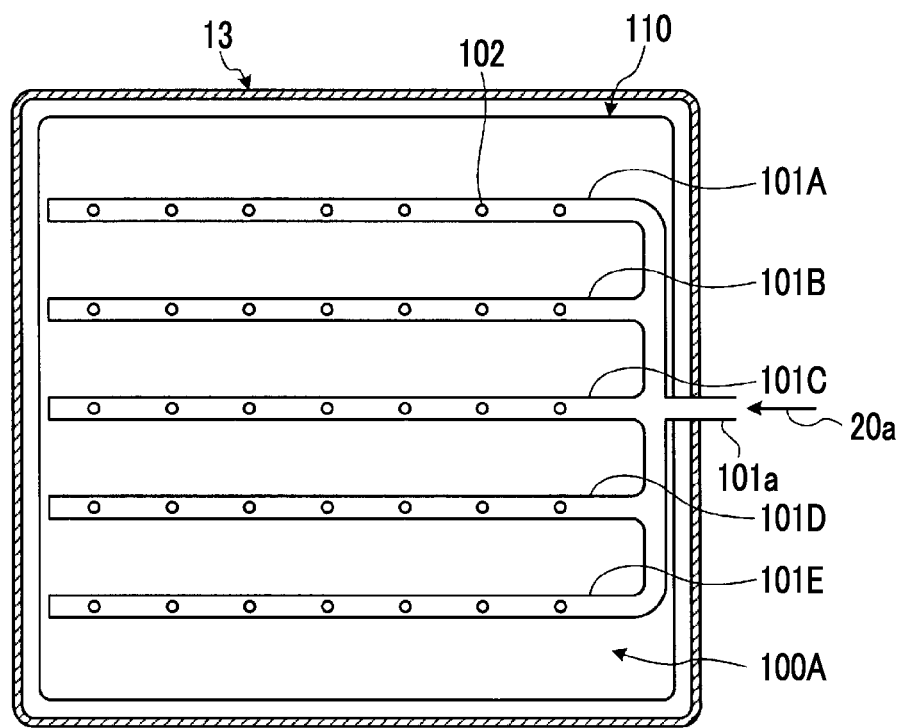
FIG. 4 is a plan view of the gas-liquid contactor related to Embodiment 1 which is arranged at a $CO_2$ absorption tower.

FIG. 1 is a perspective view of a gas-liquid contactor related to Embodiment 1. FIG. 2 is a sectional view of the gas-liquid contactor related to Embodiment 1. FIG. 3 is a perspective view of another gas-liquid contactor related to Embodiment 1. FIG. 4 is a plan view of the gas-liquid contactor related to Embodiment 1 which is arranged at a $CO_2$ absorption tower. As illustrated in FIGS. 1 and 2, a gas-liquid contactor 100A related to the present embodiment is obtained by including a header pipe 101 for supplying washing water 20a, a kind of liquid, in a direction perpendicular to a vertical axis direction, the header pipe being installed above a packed bed contacting section 110 through which exhaust gas 11A, a kind of gas, moves upward and passes; and spray nozzles 102 for discharging spray water 105, the nozzles being installed in an upward orientation at predetermined intervals on the header pipe 101. Next, the spray water 105 which has been discharged from the spray nozzles 102 is supplied at a low liquid flow rate. Also, the discharged spray water 105 becomes a liquid film 105a and falls downward along the surface of the header pipe 101, and then, falls and spreads in the packed bed contacting section 110, so that the liquid (washing water 20a) is made to contact the gas (exhaust gas 11A) moving upward through the packed bed contacting section 110. Accordingly, the washing water 20a clears and removes water-soluble substances contained in the exhaust gas 11A.

In the gas-liquid contactor 100A of the present embodiment, a dispersion plate 104 is integrally provided along an axial direction of a bottom part of the header pipe 101, and causes the washing water 20a, which falls from the liquid film 105a to a surface side of the packed bed contacting section (hereinafter referred to as "packed bed section") 110, to fall uniformly. However, when the bottom part of the header pipe 101 is provided in proximity to an upper surface 110a of the packed bed section 110, the dispersion plate may be unnecessary.

As illustrated in FIG. 2, the washing water 20a which has become the liquid film 105a falls sequentially on the upper surface 110a of the packed bed section 110, a spread 105b of the washing water is generated from this falling point, and uniform dispersion in which the inside of the packed bed section 110 gets wet uniformly is made possible. By virtue of this uniform dispersion of the washing water 20a, an excellent gas-liquid contact state with the exhaust gas 11A which passes through the packed bed section 110 can be secured. As a result, gas-liquid contact becomes excellent, and washing efficiency can be improved.

Here, in the present embodiment, the spray water 105 is supplied at a low liquid flow rate. However, this low liquid flow rate is, for example, equal to or lower than 3 $m^3/m^2 \cdot h$ of a flow rate which is much slower than a flow rate condition (for example, equal to or higher than 10 $m^3/m^2 \cdot h$) used for scrubbing in a normal $CO_2$ absorption tower, and more preferably, for example, equal to or more than 1 $m^3/m^2 \cdot h$. In this way, in the case of the low flow velocity, the supplied washing water 20a is entrained by the flow (flow velocity: for example, 3 m/s) of the exhaust gas 11A which moves upward from below, and does not contribute to scrubbing. However, since the liquid which has flowed out upward flows downward while spreading as the liquid film 105a in a wet wall state on the surface of the header pipe 101, the dispersibility of the liquid to the packed bed section 110 on the lower side can be secured without being entrained by gas even on the low liquid flow rate condition.

That is, for example, in a case where the washing water 20a is sprayed downward by downward spray nozzles as in the related art, the sprayed washing water was rebounded and floated at an upper end of the packed bed section 110, and entrainment into gas was increased. In contrast, since the gas-liquid contactor 100A of the present embodiment gradually disperses the washing water 20a which has flowed out upward so as to be dropped on the upper surface 110a of the packed bed section 110 while the washing water is made to flow downward in a state where the header pipe 101 and the dispersion plate 104 provided on a lower end side of the header pipe 101 get wet gradually, the entrainment can be suppressed.

Additionally, in the case of a related-art trough type supply, the liquid flows downward only to a limited point directly under a flow-down hole. Thus, since there was no spread within the packed bed section 110, the dispersibility of the liquid into the packed bed section 110 degraded. In contrast, in the present embodiment, the spray water 105 which has flowed out upward flows downward while spreading on the surface of the header pipe 101 in a wet wall state. Therefore, since the liquid film 105a is formed, and the liquid film 105a falls gradually on the upper surface 110a of the packed bed section 110, the excellent dispersibility of the liquid to the packed bed section 110 can be secured even on a low liquid flow rate condition.

The dispersion plate 104 of the present embodiment has a gap d with predetermined spacing between a lower end 104a thereof and an upper surface 110a of the packed bed section 110, and it is preferable that the gap d is equal to or less than about 50 mm. This is because, if this gap reaches equal to or more than 50 mm, the distribution effect is reduced, which is not preferable.

Additionally, as illustrated in the gas-liquid contactor 100B illustrated in FIG. 3, the gap d may not be provided, but the lower end 104a of the dispersion plate 104 may be made to abut against the upper surface 110a of the packed bed section 110, the liquid film 105a may be directly supplied to the upper surface 110a, and the washing water 20a may be made to directly flow downward to the packed bed section 110 from the contact point so that the washing water 20a spreads.

A plan view in which the gas-liquid contactor 100A related to the present embodiment is arranged within the absorption tower which absorbs $CO_2$ in the exhaust gas of the $CO_2$-recovering apparatus is illustrated in FIG. 4. As illustrated in FIG. 4, a plurality of header pipes 101A to 101E are arranged at predetermined intervals above the packed bed section 110 arranged inside a main body of an absorption tower 13, and the spray nozzles 102 are arranged at predetermined intervals on each of the header pipes 101A to 101E along its axial direction. In addition, the washing water 20a is introduced from an introduction part 101a, and is introduced into the respective branched header pipes 101A to 101E.

Then, the washing water 20a is supplied at a low flow velocity so that the spray water 105 is discharged from the spray nozzles 102. The discharged washing water 20a, as illustrated in FIG. 2, falls sequentially on the upper surface 110a of the packed bed section 110 using the dispersion plate 104 while falling downward along the surfaces of the respective header pipes 101A to 101E and forming the liquid film 105a.

The spread 105b of the washing water is generated from this falling point, the inside of the packed bed section 110 gets wet uniformly, and uniform dispersion is possible. By virtue of this uniform dispersion of the washing water 20a, an excellent gas-liquid contact state with the exhaust gas 11A which passes through the packed bed section 110 from the lower side can be secured. As a result, gas-liquid contact becomes excellent, and the scrubbing efficiency at which an absorbent entrained in the exhaust gas 11A is removed by the washing water 20a is improved.

Embodiment 2

Figure 5:
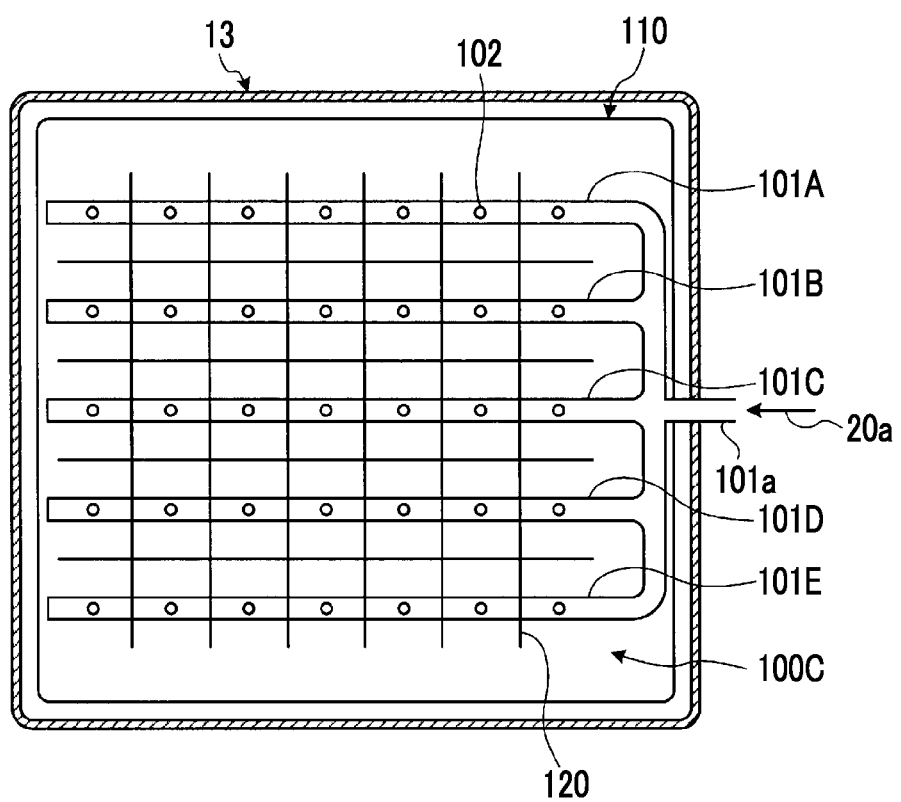
FIG. 5 is a plan view of the gas-liquid contactor related to Embodiment 2 which is arranged at the $CO_2$ absorption tower.
Figure 6:
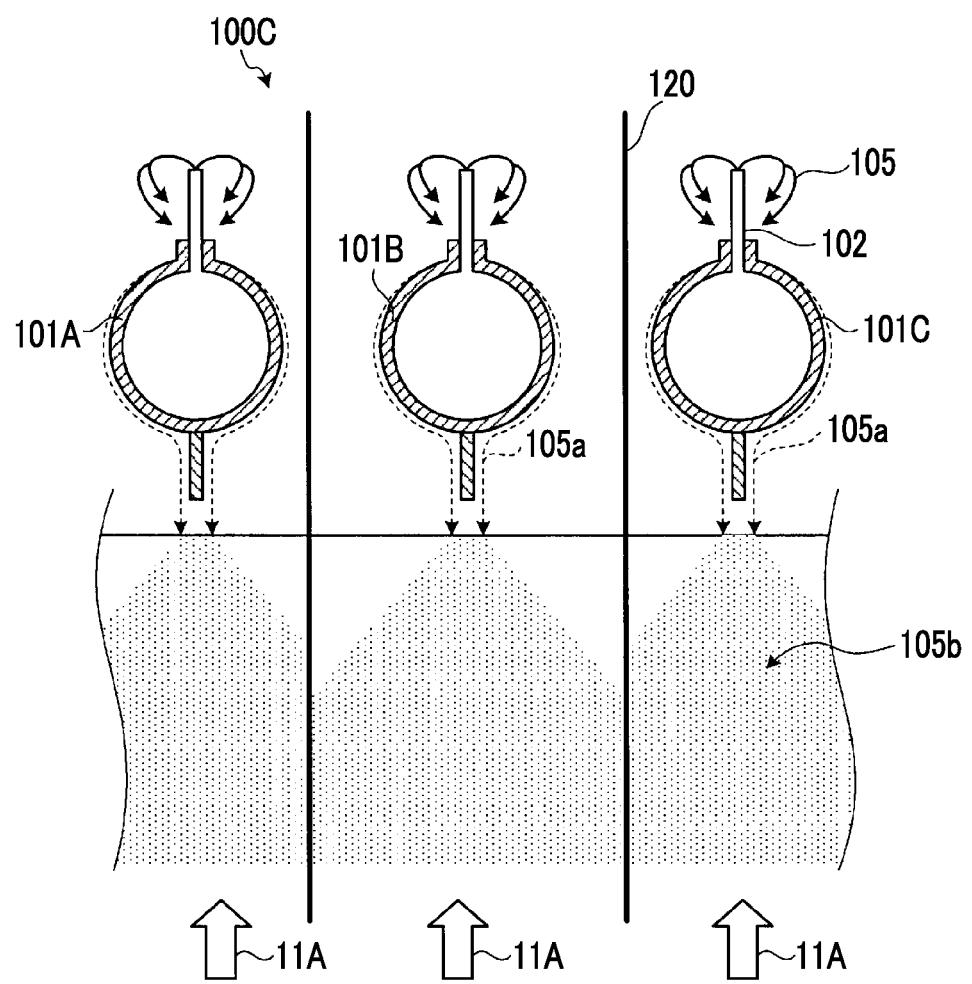
FIG. 6 is a sectional view of a gas-liquid contactor related to Embodiment 2.

FIG. 5 is a plan view of a gas-liquid contactor related to Embodiment 2 which is arranged at the $CO_2$ absorption tower. FIG. 6 is a sectional view of the gas-liquid contactor related to Embodiment 2. In addition, the same components as those of the apparatus of Embodiment 1 will be designated by the same reference numerals, and duplicate description will be omitted. As illustrated in FIGS. 5 and 6, in a gas-liquid contactor 100C related to the present embodiment, the spray nozzles 102 are arranged at predetermined intervals on the plurality of header pipes 101A to 101E, and double-cross-like partitions 120 which partition the spray nozzles 102 are arranged. Additionally, as illustrated in FIG. 6, the partitions 120 are adapted to partition not only the header pipes 101A to 101C but the inside of the packed bed section 110. In addition, the partitions 120 may be continuous, or the partitions 120 as separate components may be provided in only the packed bed section 110.

In the present embodiment, since the washing water 20a spreads in spaces partitioned by the partitions 120 by installing the partitions 120, an excellent gas-liquid contact state with the exhaust gas 11A which passes through each partitioned packed bed section 110 from the lower side can be secured. As a result, gas-liquid contact becomes more excellent than Embodiment 1, and the scrubbing efficiency at which an absorbent entrained in the exhaust gas 11A is removed by the washing water 20a is improved.

Embodiment 3

Figure 7:
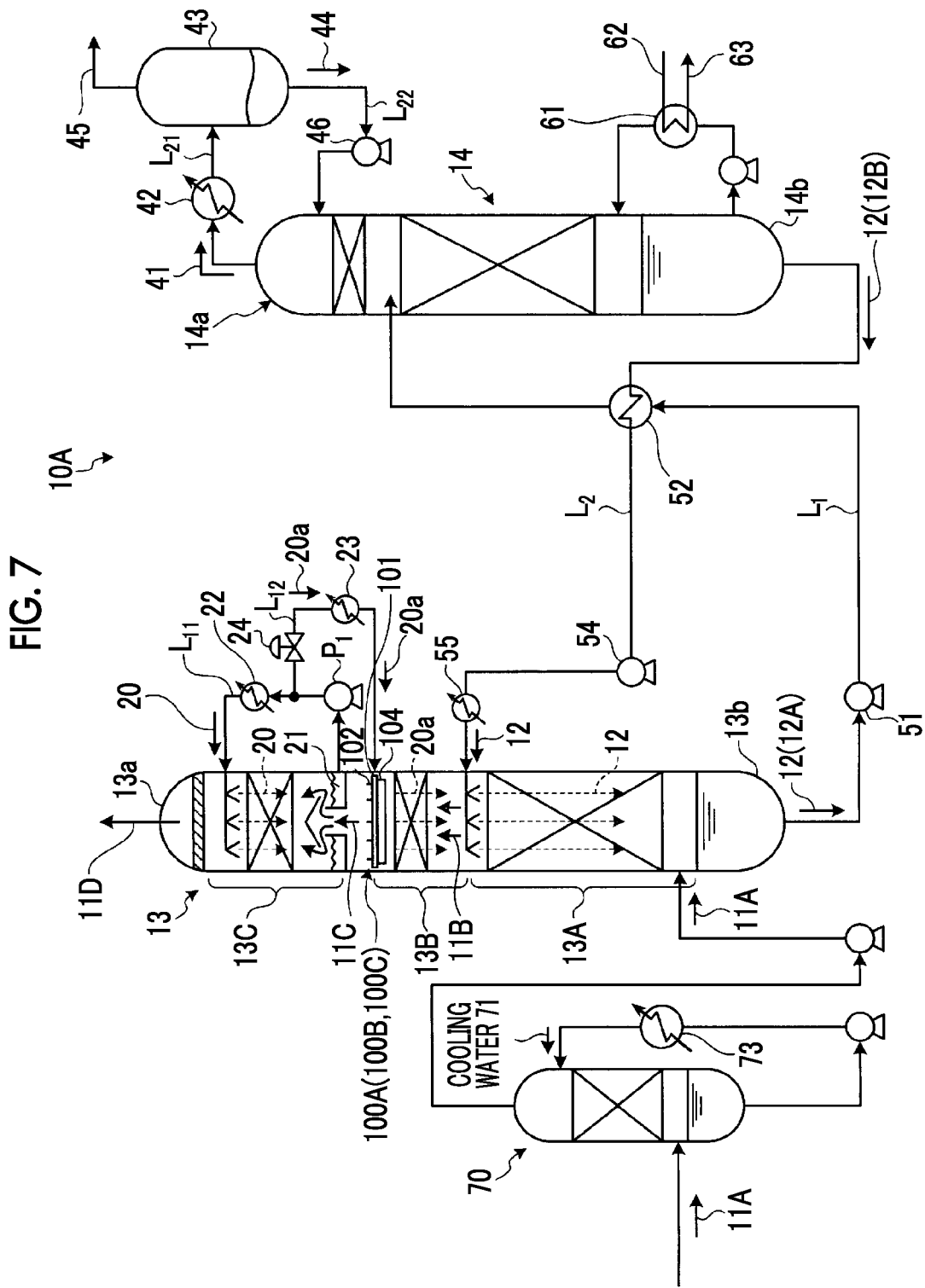
FIG. 7 is a schematic view of a $CO_2$-recovering apparatus related to Embodiment 3.

In the present embodiment, an application example in which the gas-liquid contactor of Embodiment 1 or 2 is installed within the absorption tower of the $CO_2$-recovering apparatus will be described. FIG. 7 is a schematic view of the $CO_2$-recovering apparatus related to Embodiment 3. As illustrated in FIG. 7, a $CO_2$-recovering apparatus 10A related to the present embodiment includes the absorption tower 13 which absorbs $CO_2$ gas from the exhaust gas 11A containing $CO_2$ using a $CO_2$ absorption liquid 12 which circulates in a closed system; an absorption liquid regeneration tower 14 which emits the $CO_2$ gas from a rich solution 12A which is a $CO_2$ absorption liquid which has absorbed $CO_2$ gas in the absorption tower 13; a rich solution supply line $L_1$ through which the absorption liquid which has absorbed $CO_2$ gas in the absorption tower 13 is extracted as the rich solution 12A from a bottom part 13b of the absorption tower 13 and is introduced into the absorption liquid regeneration tower 14 side; and a lean solution supply line $L_2$ through which the absorption liquid regenerated in the absorption liquid regeneration tower 14 is extracted as a lean solution 12B from the bottom part 14b of the absorption liquid regeneration tower 14 and is introduced into the absorption tower 13. Also, the absorption tower 13 includes a $CO_2$ absorption section 13A which brings the exhaust gas 11A containing $CO_2$ into contact with the $CO_2$ absorption liquid 12 and absorbs $CO_2$ in the exhaust gas; a main washing section 13C which is disposed on an upper stage side of the $CO_2$ absorption section 13A, cools $CO_2$-removed exhaust gas 11C from which $CO_2$ has been removed, and recovers entrained CO2 absorption liquid using the washing water 20; and a condensed water receiving section 21 which is disposed on a lower side of the main washing section 13C, and recovers the condensed water within the main washing section 13C. The gas-liquid contactor 100A (100B, 100C) is applied to a lower stage side of the condensed water receiving section 21, as a preliminary washing section 13B which performs preliminary washing of the $CO_2$-removed exhaust gas 11B.

In the $CO_2$-recovering apparatus 10A for the exhaust gas 11A containing $CO_2$, the exhaust gas is sent to a gas cooling tower 70 before being introduced into the absorption tower 13, is cooled within the cooling tower 70 by cooling water 71 cooled in a cooling section 73, is adjusted to a predetermined temperature, and is introduced into the absorption tower 13.

The absorption tower 13 has the $CO_2$ absorption section 13A provided inside the tower, and improves the countercurrent contact efficiency between the exhaust gas 11A and the lean solution 12B which is an absorption liquid when the $CO_2$ absorption section 13A passes through the tower. In addition, a plurality of the packed bed sections where gas-liquid contact is performed may be provided, and the exhaust gas 11A and the $CO_2$ absorption liquid 12 are brought into countercurrent contact with each other, for example by a spray method, a liquid column method, a plate column method, or the like in addition to the packed bed method.

In the absorption tower 13, the exhaust gas 11A comes into countercurrent contact with the lean solution 12B which is an absorption liquid of an amine-based absorption liquid, $CO_2$ in the exhaust gas 11A is absorbed to an absorption liquid side by a chemical reaction, and $CO_2$-absorbent-removed exhaust gas 11D from which $CO_2$ has been removed is emitted to the outside of the system from a tower top 13a.

In the present embodiment, the preliminary washing section 13B which performs preliminary washing of the exhaust gas 11A using the washing water 20a is provided above the $CO_2$ absorption section 13A (gas flow back flow side), and the absorption liquid entrained in the exhaust gas 11A is preliminarily washed and removed.

In this preliminary washing, by applying the gas-liquid contactor 100A (100B, 100C) of Embodiment 1 or Embodiment 2, gas-liquid contact becomes reliable and preliminary washing becomes reliable.

The main washing water which has been subjected to preliminarily washing is made to fall to the $CO_2$ absorption section 13A side as it is, and is discharged to the absorption liquid regeneration tower 14 as the rich solution 12A.

Main washing is carried out on the $CO_2$-removed exhaust gas 11C, which has passed through the preliminary washing section 13B, in the main washing section 13C in which the washing water 20 circulates through the circulation line $L_{11}$.

In the main washing section 13C, the washing water 20 which circulates through the circulation line $L_{11}$ is circulated by a circulation pump $P_1$, is cooled with cooling water in a heat exchange unit 22, and the exhaust gas 11A to be emitted to the outside is mainly cleared.

The exhaust gas 11C from which $CO_2$ has been removed is emitted to the outside as the $CO_2$-absorbent-removed exhaust gas 11D by the preliminary washing and the main washing.

In addition, the washing water 20a in the preliminary washing section 13B is introduced into the header pipe 101 of the gas-liquid contactor 100A (100B, 100C) after being supplied from a branch line $L_{12}$ branched in part from the circulation line $L_{11}$ and being cooled using cooling water by the heat exchange unit 23. The branched washing water 20a is supplied to the preliminary washing section 13B at a low flow velocity by the adjustment of a valve 24.

The rich solution 12A with high $CO_2$ concentration into which $CO_2$ has been absorbed within the absorption tower 13 is supplied to the absorption liquid regeneration tower 14 side via the rich solution supply line $L_1$ by a rich solvent pump 51, is introduced into the tower from the vicinity of the tower top 14a of the absorption liquid regeneration tower 14 having the packed bed section, and causes an endothermic reaction of $CO_2$ stripping from the solution with steam indirectly heated by saturated steam 62 in a reboiler 61 when flowing downward within the tower, and most of the $CO_2$ is emitted and regenerated. In addition, the saturated water vapor 62 after the heating becomes steam condensed water 63.

Additionally, $CO_2$ gas 41 which has entrained the steam discharged from the rich solution 12A inside the tower is led out from the tower top 14a of the absorption liquid regeneration tower 14. Then, the $CO_2$ gas 41 which has entrained the steam is led out by the gas discharge line $L_{21}$, and the steam is condensed by a condenser 42 interposed in the gas discharge line $L_{21}$, condensed water 44 is separated by a separation drum 43, $CO_2$ gas 45 is emitted to the outside of the system, and post-processing, such as compression recovery, is separately performed.

The condensed water 44 separated by the separation drum 43 is supplied to an upper part of the absorption liquid regeneration tower 14 by a condensed water circulation pump 46 interposed in the condensed water line $L_{22}$, and is used for purification of the $CO_2$ gas.

The lean solution 12B with low $CO_2$ concentration regenerated in the absorption liquid regeneration tower 14 is subjected to heat exchange with the rich solution 12A by a rich/lean solution heat exchanger 52 and is cooled, is then raised in pressure by a lean solvent pump 54, and is further cooled by the lean solvent cooler 55. Thereafter, the lean solution is supplied again to the absorption tower 13 and is circulated and reused as an absorption liquid.

Here, the $CO_2$ absorption liquid 12 is circulated and reused in the closed system within the CO2-recovering apparatus 10A, is referred to as the rich solution 12A after $CO_2$ gas has been absorbed in the absorption tower 13, and is referred to as the lean solution 12B after $CO_2$ is emitted in the absorption liquid regeneration tower 14. Regeneration is performed in a reclaiming device according to a degradation situation, and replenishment of the absorption liquid is performed if necessary.

In the present embodiment, by applying the gas-liquid contactor 100A (100B, 100C) when the preliminary washing is performed using part of the washing water 20 used for the cleaning in the main washing section 13C in a stage before being introduced into the main washing section 13C, gas-liquid contact becomes reliable and preliminary washing becomes reliable.

In addition, in the main washing section 13C, the washing water 20 is not supplied from the outside. However, it is possible to use the moisture, which is condensed when washing is performed using the cooled washing water 20 which circulates through the $CO_2$-removed exhaust gas 11C which has passed through the preliminary washing section 13B, as washing water.

When the washing water 20 used for cleaning in the main washing section 13C is applied in the preliminary washing section 13B, the capacity of absorbing the absorbent still remains in the washing water 20. However, a gas-liquid contact effect is enhanced by securing uniform liquid dispersibility even at a small liquid flow rate and increasing gas-liquid contact area.

Hence, by applying the gas-liquid contactor 100A (100B, 100C) like the present embodiment, a cleaning effect can be exhibited even when the liquid of the low flow velocity is supplied.

This washing water which has been subjected to preliminarily washing is made to fall to the $CO_2$ absorption section 13A side as it is, and is discharged to the absorption liquid regeneration tower 14 side as the rich solution 12A.

In this way, in the preliminary washing section 13B, the preliminary washing is performed using the washing water 20a (for example, 2 wt. % to 3 wt. % of absorbent concentration) in which the capacity of absorbing the absorbent entrained in the $CO_2$-removed exhaust gas 11B remains. Accordingly, for example, when using washing water in which the concentration of the $CO_2$ absorption liquid (lean solution 12B) 12 used in the $CO_2$ absorption section 13A is 30 wt. %, the absorbent in the exhaust gas can be absorbed and removed up to this concentration in the preliminary washing section 13B. As a result, the absorbent concentration in the $CO_2$-removed exhaust gas 11C to be introduced into the main washing section 13C is markedly reduced compared to a case where the preliminary washing section 13B is not installed. Hence, since the recovery load of the absorbent in the main washing section 13C is reduced, absorbent removal efficiency is further improved.

Embodiment 4

Figure 8:
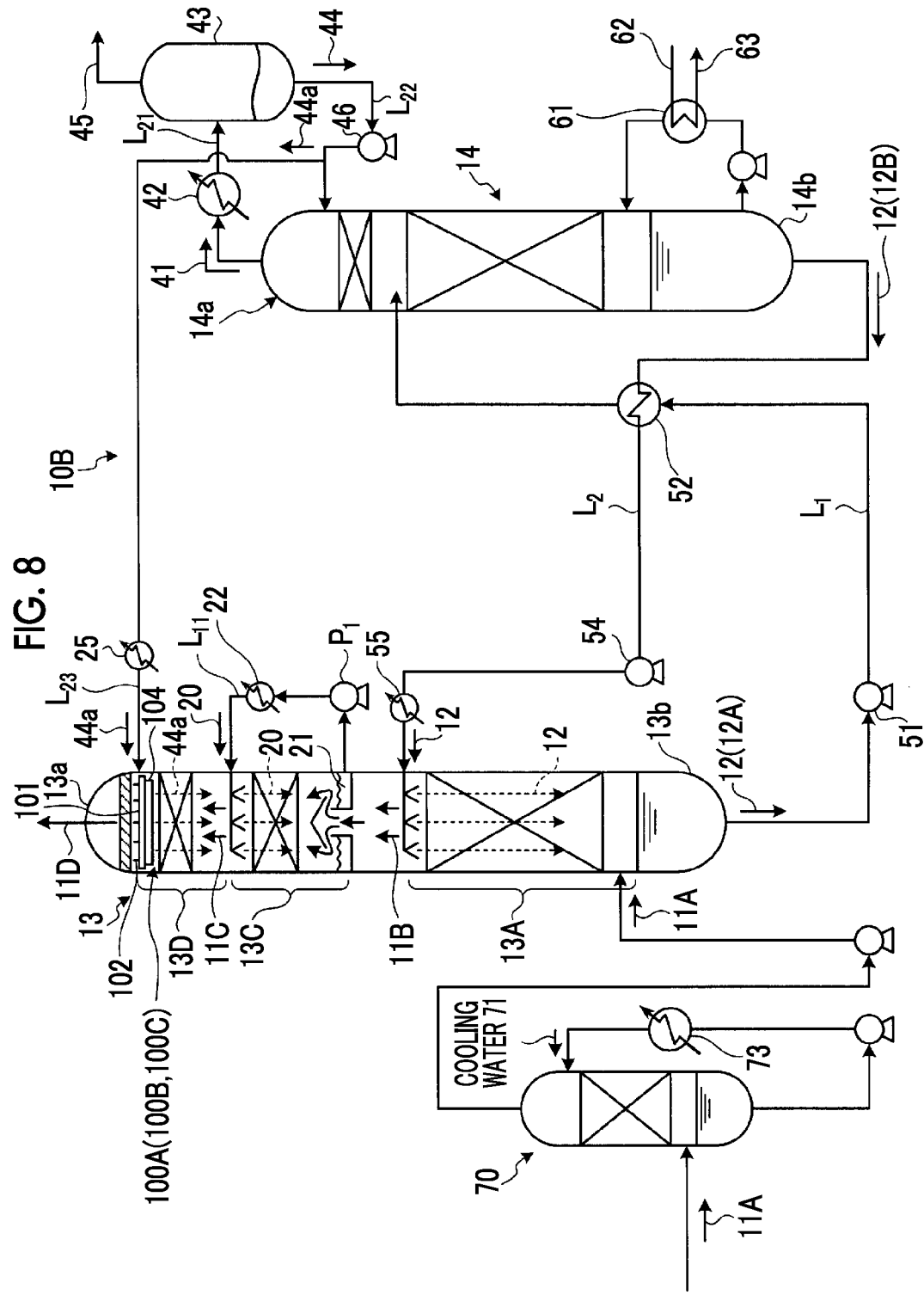
FIG. 8 is a schematic view of a $CO_2$-recovering apparatus related to Embodiment 4.

In the present embodiment, an application example in which the gas-liquid contactor of Embodiment 1 or 2 is installed within the absorption tower of the $CO_2$-recovering apparatus will be described. FIG. 8 is a schematic view of the $CO_2$-recovering apparatus related to Embodiment 4. As illustrated in FIG. 8, in a $CO_2$-recovering apparatus 10B related to the present embodiment, gas-liquid contact becomes reliable and deep washing becomes reliable, by disposing a deep washing section 13D on a back flow side of the main washing section 13C instead of the preliminary washing section installed in Embodiment 3, and applying the gas-liquid contactor 100A (100B, 100C) of Embodiment 1 or Embodiment 2 to the deep washing section 13D.

As the washing water to be supplied to the deep washing section 13D, a portion 44a, which has been condensed from the $CO_2$ gas 41 which has entrained the steam discharged from the top 14a of the absorption liquid regeneration tower 14 and has been separated as the condensed water 44 in the separation drum 43, is used via an introduction line $L_{23}$. Since the condensed water 44 separated in the separation drum 43 is regenerated in the absorption liquid regeneration tower 14, this condensed water has thin $CO_2$ gas concentration, and is suitable for deep washing. In addition, reference numeral 25 represents a cooler which cools the portion 44a separated as the condensed water 44.

Which is, when the portion 44a of the condensed water 44 is applied in the deep washing section 13D, the condensed water 44 from the $CO_2$ gas 41 which has entrained the steam discharged from the absorption liquid regeneration tower 14 has thin absorbent concentration (for example, 1 wt. % or less of absorbent concentration). Thus, the gas-liquid contact effect is enhanced by securing uniform liquid dispersibility even at a small liquid flow rate and increasing a gas-liquid contact area.

Hence, by applying the gas-liquid contactor 100A (100B, 100C) like the present embodiment to the deep washing section 13D, the cleaning effect can be exhibited even when the liquid of the low flow velocity is supplied. In addition, the main washing water subject to this deep washing is made to fall to the main washing section 13C side as it is, which contributes to the cleaning of the main washing.

Embodiment 5

Figure 9:
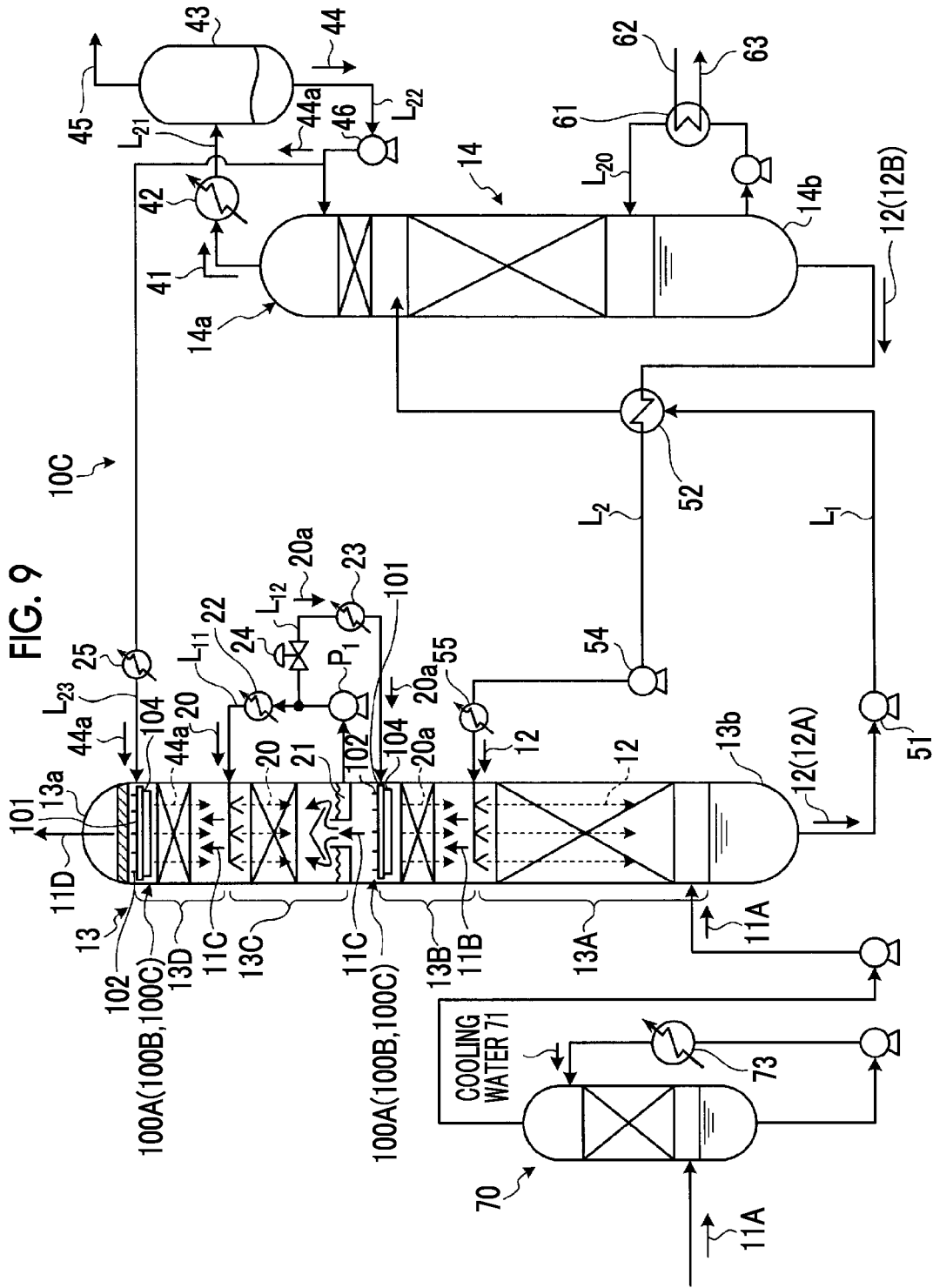
FIG. 9 is a schematic view of a $CO_2$-recovering apparatus related to Embodiment 5.

In the present embodiment, an application example in which the gas-liquid contactor of Embodiment 1 or 2 is installed within the absorption tower of the $CO_2$-recovering apparatus will be described. FIG. 9 is a schematic view of the $CO_2$-recovering apparatus related to Embodiment 5. As illustrated in FIG. 9, in a $CO_2$-recovering apparatus 10C related to the present embodiment, the preliminary washing section 13B installed in Embodiment 3, and the deep washing section 13D installed in Embodiment 4 are respectively installed on the front and back flow sides of the main washing section 13C.

By disposing the preliminary washing section 13B installed in this embodiment 3 and the deep washing section 13D installed in Embodiment 4 on the front and rear flow sides, respectively, of the main washing section 13C, a synergistic effect of cleaning in which the effect of the preliminary washing and the effect of the deep washing are combined together can be exhibited, and the residual ratio of the $CO_2$ absorbent in the $CO_2$-absorbent-removed exhaust gas 11D discharged to the outside can be markedly reduced.

Figure 10:
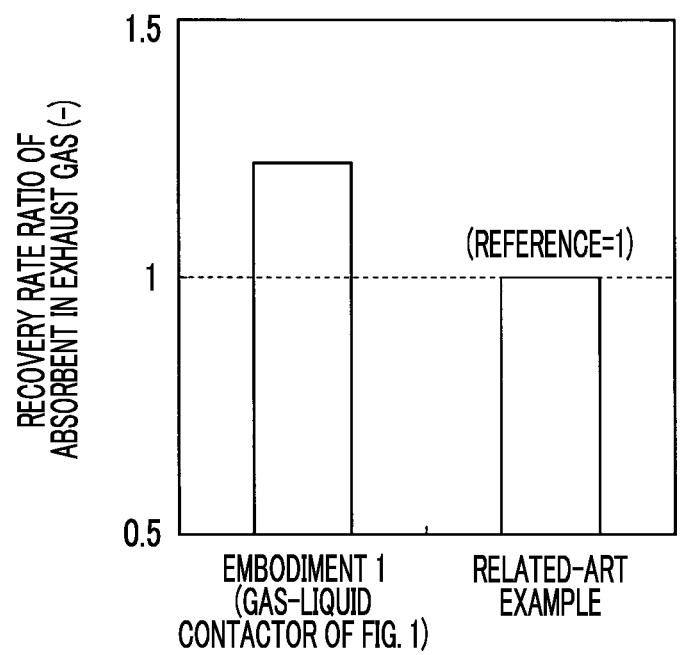
FIG. 10 is a view illustrating the recovery rate ratio of an absorbent in exhaust gas when using the gas-liquid contactor related to Embodiment 1.

FIG. 10 is a view illustrating the recovery rate ratio of an absorbent in exhaust gas when using the gas-liquid contactors related to Embodiments 1 and 2.

As illustrated in FIG. 10, when a spray method of a related-art example was adopted as Reference (1), the recovery ratio of the absorption liquid in the exhaust gas could be increased to about 1.2 by using the gas-liquid contactor 100A of FIG. 1 related to Embodiment 1 for the deep washing section 13D of Embodiment 4.

Figure 11:
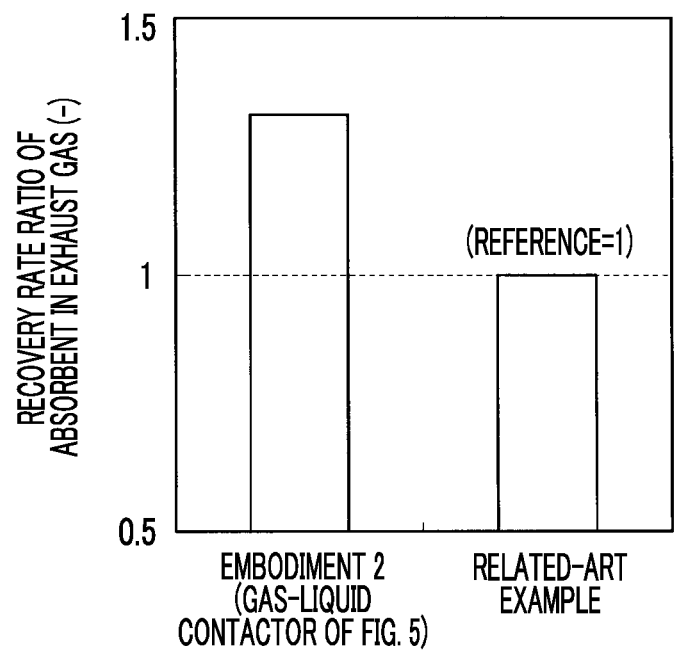
FIG. 11 is a view illustrating the recovery rate ratio of an absorbent in exhaust gas when using the gas-liquid contactor related to Embodiment 2.

Additionally, as illustrated in FIG. 11, when the spray method of the related-art example was adopted as Reference (1), and when the gas-liquid contactor 100C illustrated in FIG. 5 related to Embodiment 2 is used for the deep washing section 13D of Embodiment 4 and the partitions 120 are arranged, the recovery ratio of the absorption liquid in the exhaust gas could be further increased to about 1.3 times.

REFERENCE SIGNS LIST

10A TO 10C: $CO_2$-RECOVERING APPARATUS
11A: $CO_2$-CONTAINING EXHAUST GAS (EXHAUST GAS)
12: $CO_2$ ABSORPTION LIQUID
12A: RICH SOLUTION
12B: LEAN SOLUTION
13: $CO_2$ ABSORPTION TOWER (ABSORPTION TOWER)
13A: $CO_2$ ABSORPTION SECTION
13B: PRELIMINARY WASHING SECTION
13C: MAIN WASHING SECTION
100A TO 100C: GAS-LIQUID CONTACTOR
101: HEADER PIPE
102: SPRAY NOZZLE
104: DISPERSION PLATE
105: SPRAY WATER
105a: LIQUID FILM
110: PACKED BED CONTACTING SECTION (PACKED BED SECTION)
120: PARTITION

The invention claimed is:

1. A gas-liquid contactor comprising:
a header pipe for supplying a liquid in a direction perpendicular to a vertical axis direction, the header pipe being installed above a packed bed contacting section through which an exhaust gas moves upward and passes; and
spray nozzles for discharging spray water, the nozzles being installed, in an upward orientation, at predetermined intervals on the header pipe,
wherein the spray water is supplied at a low liquid flow rate, the discharged spray water becomes a liquid film and falls downward along the surface of the header pipe, and then falls and spreads in the packed bed contacting section, so that the liquid is made to contact the gas moving upward through the packed bed contacting section and is used to clear and remove water-soluble substances contained in the gas,
wherein a dispersion plate is integrally provided along an axial direction of a bottom part of the header pipe.

2. The gas-liquid contactor according to claim 1, wherein a lower end of the dispersion plate comes into contact with an upper surface of the packed bed contacting section.

3. The gas-liquid contactor according to claim 1, wherein partitions which partition the spray nozzles provided on the header pipe are provided in the shape of a double cross.

4. The gas-liquid contactor according to claim 3, wherein the packed bed contacting section is provided with partitions for packed bed contacting corresponding to the partitions.

5. A $CO_2$-recovering apparatus comprising:
an absorption tower which brings an exhaust gas containing $CO_2$ into contact with a $CO_2$ absorption liquid to remove $CO_2$;
an absorption liquid regeneration tower which regenerates a rich solution, which has absorbed $CO_2$, through heat exchange;

a rich solution supply line through which the rich solution is extracted from the absorption tower and is introduced into the absorption liquid regeneration tower side; and a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower, the absorption tower including:

a $CO_2$ absorption section which brings the exhaust gas containing $CO_2$ into contact with the $CO_2$ absorption liquid and absorbs $CO_2$ in the exhaust gas;

a main washing section which is disposed on an upper stage side of the $CO_2$ absorption section, cools a $CO_2$-removed exhaust gas from which $CO_2$ has been removed, and recovers entrained $CO_2$ absorption liquid using washing water;

a condensed water receiving section which is disposed on a lower side of the main washing section, and recovers the condensed water within the main washing section; and the gas-liquid contactor according to claim 1 which is provided on a lower stage side of the condensed water receiving section, and performs preliminary washing of the $CO_2$-removed exhaust gas.

6. A $CO_2$-recovering apparatus comprising:

an absorption tower which brings an exhaust gas containing $CO_2$ into contact with a $CO_2$ absorption liquid to remove $CO_2$;

an absorption liquid regeneration tower which regenerates a rich solution, which has absorbed $CO_2$, through heat exchange;

a rich solution supply line through which the rich solution is extracted from the absorption tower and is introduced into the absorption liquid regeneration tower side; and a lean solution supply line through which a lean solution into which CO2 regenerated in the absorption liquid regeneration tower has been emitted is extracted from the absorption liquid regeneration tower, and is introduced into the absorption tower, and the lean solution is reused as the $CO_2$ absorption liquid in the absorption tower, the absorption tower including:

a $CO_2$ absorption section which brings the exhaust gas containing $CO_2$ into contact with the $CO_2$ absorption liquid and absorbs $CO_2$ in the exhaust gas;

a main washing section which is disposed on an upper stage side of the $CO_2$ absorption section, cools a $CO_2$-removed exhaust gas from which $CO_2$ has been removed, and recovers entrained $CO_2$ absorption liquid using washing water;

a condensed water receiving section which is disposed on a lower side of the main washing section, and recovers the condensed water within the main washing section; and the gas-liquid contactor according to claim 1 which is provided on an upper stage side of the main washing section, and performs deep washing of the $CO_2$-removed exhaust gas after passage through the main washing section.

7. A $CO_2$-recovering apparatus comprising:

an absorption tower which brings an exhaust gas containing $CO_2$ into contact with a $CO_2$ absorption liquid to remove $CO_2$;

an absorption liquid regeneration tower which regenerates a rich solution, which has absorbed $CO_2$, through heat exchange;

a rich solution supply line through which the rich solution is extracted from the absorption tower and is introduced into the absorption liquid regeneration tower side; and a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower, the absorption tower including:

a $CO_2$ absorption section which brings the exhaust gas containing $CO_2$ into contact with the $CO_2$ absorption liquid and absorbs $CO_2$ in the exhaust gas;

a main washing section which is disposed on an upper stage side of the $CO_2$ absorption section, cools a $CO_2$-removed exhaust gas from which $CO_2$ has been removed, and recovers entrained $CO_2$ absorption liquid using washing water;

a condensed water receiving section which is disposed on a lower side of the main washing section, and recovers the condensed water within the main washing section;

the gas-liquid contactor according to claim 1 which is provided on a lower stage side of the condensed water receiving section, and performs preliminary washing of the $CO_2$-removed exhaust gas; and the gas-liquid contactor according to claim 1 which is provided on an upper stage side of the main washing section, and performs deep washing of the $CO_2$-removed exhaust gas after passage through the main washing section.

* * * * *